Figure 1:
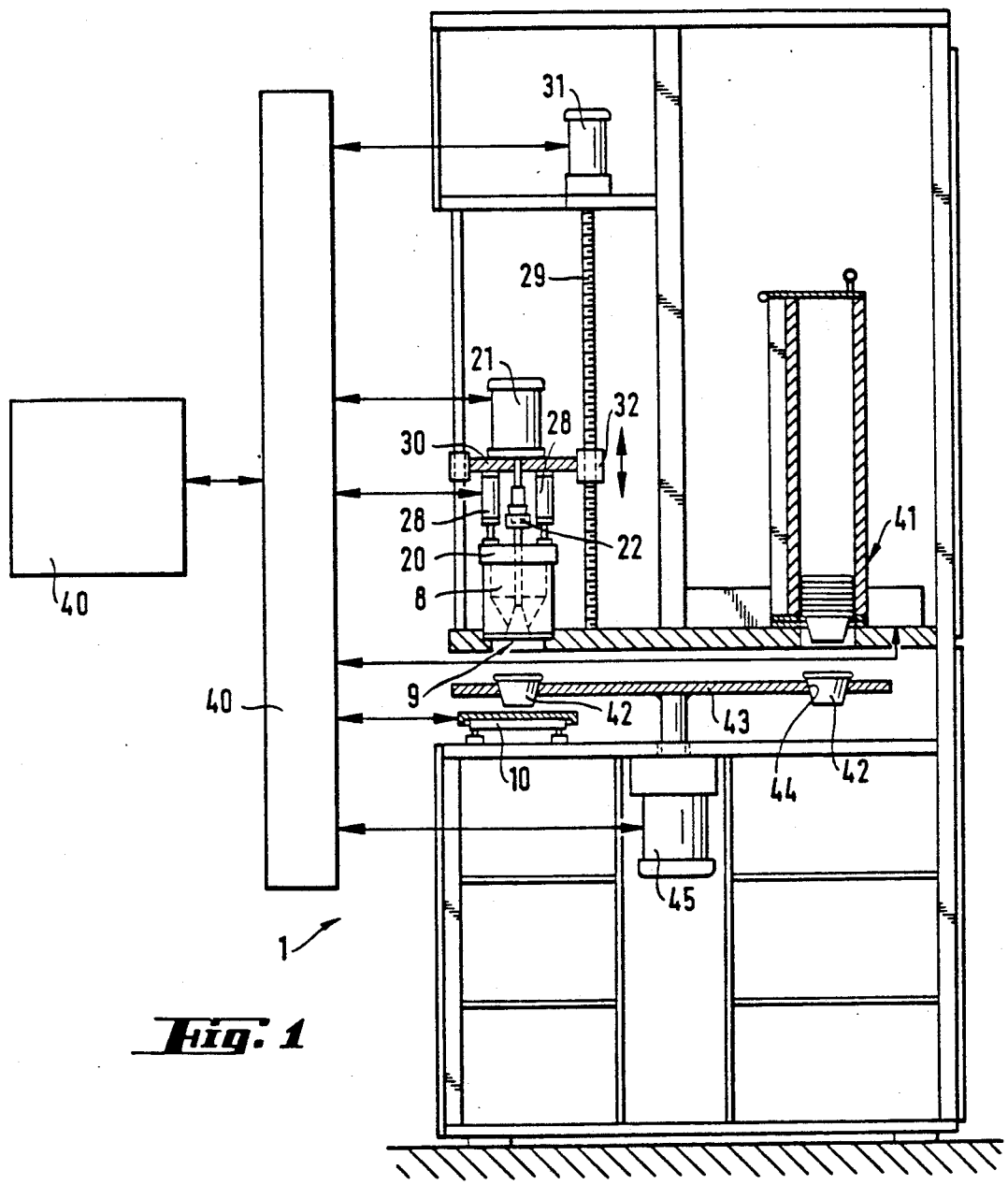

United States Patent [19]

Mheidle et al.

[11] Patent Number: 5,145,009
[45] Date of Patent: Sep. 8, 1992

[54] APPARATUS FOR METERING DRY AND/OR PULVERULENT POURABLE MATERIAL, ESPECIALLY DYE POWDER

[75] Inventors: Mickael Mheidle, Sausheim, France; Roland Bauhofer, Böckten, Switzerland

[73] Assignee: Ciba-Geigy Corporation, Ardsley, N.Y.

[21] Appl. No.: 543,254

[22] Filed: Jun. 25, 1990

[30] Foreign Application Priority Data

Jun. 27, 1989 [CH] Switzerland ............... 2381/89

[51] Int. Cl.⁵ .................... B65B 1/30; G01F 11/20
[52] U.S. Cl. ...................................... 141/83; 141/270; 222/510; 222/410
[58] Field of Search ............. 141/83, 144, 145, 146, 141/147, 339, 159, 179, 365, 135; 222/504, 510, 410, 411, 404, 414; 366/194, 195

[56] References Cited

U.S. PATENT DOCUMENTS

| | | | |
|---|---|---|---|
| 4,478,300 | 10/1984 | Mikami | 177/59 |
| 4,696,329 | 9/1987 | Izzi | 141/83 |
| 4,821,782 | 4/1989 | Hyer | 141/83 |
| 4,844,297 | 7/1989 | Smith | 222/1 |
| 4,886,097 | 12/1989 | Gaiza-Ondaiza | 141/339 |

FOREIGN PATENT DOCUMENTS

| | | |
|---|---|---|
| 016904 | 10/1980 | European Pat. Off. . |
| 226157 | 11/1987 | European Pat. Off. . |
| 295035 | 4/1988 | European Pat. Off. . |
| 287708 | 12/1988 | European Pat. Off. . |
| 59-57834 | 7/1984 | Japan . |
| 258812 | 5/1926 | United Kingdom ............... 222/510 |

Primary Examiner—Ernest G. Cusick
Assistant Examiner—David J. Walczak
Attorney, Agent, or Firm—Wenderoth, Lind & Ponack

[57] ABSTRACT

An apparatus (1) for metering dry and pulverulent pourable material, for example dye powder in a laboratory dyeing line for textiles, the apparatus (1) having a discharge container (8) which has a closable outlet (9) in its lower region, scales (10) for metering the amount of material that is to be conveyed from the outlet (9) of the container (8), with outlet (9) being arranged on the underside of the container (8) and having as closure a valve body (12) that tapers towards the top and can be displaced vertically downwards, the valve body (12) being drivable in rotation and rotating while it is in its open position and having the capability for conveying the material in the direction towards the outlet opening (14), therefore performing a dual function.

22 Claims, 7 Drawing Sheets

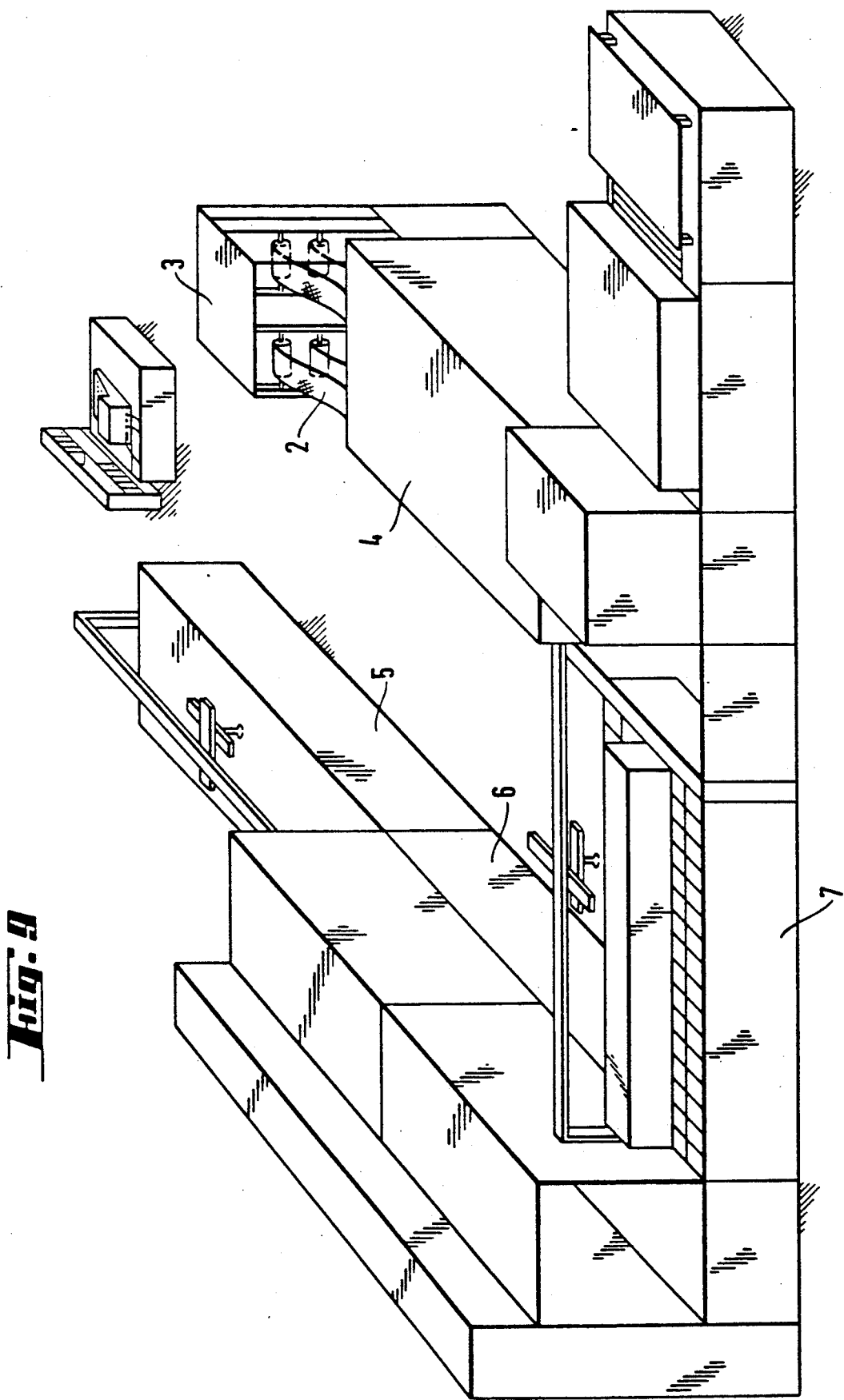

APPARATUS FOR METERING DRY AND/OR PULVERULENT POURABLE MATERIAL, ESPECIALLY DYE POWDER

The invention relates to an apparatus for metering dry and/or pulverulent pourable material, especially dye powder, for example in a laboratory dyeing line for textiles, having a discharge container, which has a closable outlet in its lower region, and having a scales for the amount to be metered that can be charged from the outlet of the container using a conveying means, preferably a rotating conveying means.

Such an apparatus is known from EP-A-0 287 708. The lower region of the discharge container of this known apparatus is penetrated by a conveyor screw which is able to transport the pulverulent dye out of the container through a lateral opening. The dye trickles from there into the scales which is arranged below the discharge opening and which is able to interrupt the further discharge operation once a set weight has been reached by the drawing of a closure plate in front of the discharge openings and the stopping of the drive motor for the conveyor screw.

Apart from the fact that the conveyor screw in the lower region of the discharge container can only ever collect material falling from above while material to the sides of and below the screw is left behind and can undergo ageing, this apparatus operates with a certain amount of sluggishness because the time from the signal being emitted by the scales until the drive motor for the conveyor screw is stopped and, especially, until the closure means is retracted into the closed position is so long that excessive amounts of dye powder, which cannot as yet be accurately calculated, can be discharged.

Similar apparatuses having lateral discharge are known, for example, from EP-A-295 035. In these apparatuses the powder is conveyed to a weighing device by vibration of the supply container, by simple inclination of the container or with the aid of conveyor screws or paddle stirrers. Vibration and inclination of the container do not allow great accuracy of metering. In the case of conveyor screws and paddle stirrers, metering problems arise as a result of running-on of the conveying devices.

EP-A-16 904 and Patent Abstracts of Japan, Vol. 8, No. 164 (M 313) [1601], 28th Jul. 1984; and JP-A-59 57 834 disclose bunker-like containers having an opening in the base region. In the region of the opening there is arranged a rotatable rotary cone which is intended to facilitate discharge through the permanently open annular gap. Such bunkers are used, for example, as supply reservoirs for downstream metering devices and are not designed for direct metering.

EP-A-251 754 (U.S. Pat. No. 4,844,297) describes a metering device for liquids. The metering of the liquid is effected in two stages. First, rough metering is effected by forcing the liquid under pressure through a first outlet opening. The exact adjustment of the desired amount is effected by a further addition of liquid through a second, subsidiary opening. This form of two-stage metering is very complicated and, in addition, can hardly be transferred to powders.

In connection with the transportation of liquids to which particles have been added, EP-A-226 157 describes it as advantageous in a valve to construct the valve body so as to be rotatable relative to the valve seat. In this way the valve seat can be freed of adhering particles by rotating the valve body during the closing operation.

EP-A-74 283 (U.S. Pat. No. 4,478,300) proposes in connection with weighing devices for granules and the like to provide smooth surfaces with burls, flutes, channels and the like in order to prevent the material being weighed from adhering.

The metering devices for powders known hitherto have the disadvantage that because of their design it is not possible to achieve sufficiently accurate metering.

However, in laboratory dyeing lines, in which dyeing tests are to be made with textiles, very considerable precision is required when metering the dye powder.

There is therefore a problem of providing an apparatus of the type mentioned at the beginning with which it is possible, on the one hand, to improve the accuracy of metering and, on the other hand, to increase operating speed. Furthermore, the contamination of the workplace with dye powder should largely be avoided.

The solution to this problem lies in an arrangement wherein the outlet is arranged on the underside of the container and has as closure a valve body that tapers towards the top and can be displaced vertically downwards, wherein the valve body can be driven in rotation and rotates at least while it is in its open position and has means for conveying the material in the direction towards the outlet opening and/or means for counteracting agglutination of the material.

The arrangement of the outlet on the underside of the container ensures that none of the container contents is left behind and undergoes, for example, color changes over the course of time. Furthermore, it is possible thereby to utilize gravity for discharging the powder to be metered.

It is especially expedient and advantageous, however, that the closure for the discharge or outlet opening at the same time has conveying means so that especially the end of the discharge process can be determined very precisely, and there is no need for two processes to be carried out independently, i.e. the stopping of a conveying means and the displacement of a closure. Using the apparatus according to the invention it is thus possible towards the end of the metering operation to begin closing the outlet opening and optionally also to begin reducing the conveying speed, so that once the preselected weight has been reached on the metering scales the discharge of the dye powder can be ended with great accuracy. In addition, the dual function of the valve body as closure and as conveying means allows the operating speed to be high at the beginning and during the first, greater portion of the metering operation when it is possible to operate at a relatively high speed and with a large gap at the outlet opening, these two functions and their control readily being combined with one another. Agglutination, such as can occur in the region of conveyor screws beside the area of the conveying threads of such screws, is avoided.

It is particularly advantageous if a funnel is provided in the base region of the container above the outlet opening closed by the valve body, thereby providing a more reliable and better supply of material to the valve body and thus to the conveying means by which it can be collected and discharged.

The outlet opening can widen—preferably conically—from the narrowest point of the funnel to the underside of the container and the valve seat. This can be achieved in a trouble-free manner by having the valve body taper from the valve seat towards the top, and has the advantage that material cannot accumulate or agglutinate between the valve body and the outlet opening.

The largest cross-section of the widening outlet opening can correspond to the largest cross-section of the valve body, and in the closed position preferably the lower end face of the valve body can be flush with the underside of the container. As a result, the valve body, and in particular its important sealing region, is protected inside the base of the container, as is the corresponding counterseal region of the outlet opening.

As conveying means it is possible to provide on the rotating valve body at least one vane, and preferably several vanes distributed uniformly over the circumference. The vane(s) acting as conveying means is(are) advantageously arranged on the valve body in its region of reduced diameter and is (are) curved from the top to the bottom in the manner of a scoop in such a way that when the valve body rotates the material is advanced downwards. Such vanes have the advantage that they not only have a good conveying action but are also able to break up any lumps in the material to be metered, without the formation inside the feed funnel as far as the widening outlet opening, and possibly also inside the outlet opening, of a channel in the pulverulent material, into which material from the side does not fall. Such an undesirable phenomenon occurring in conveyor screws is also prevented by the vertical displacement movement of the conveying means occurring when the valve body is opened and closed and being associated with the metering, and by the conical shape of the valve body.

The means for conveying and/or for counteracting agglutination of the material can be arranged on the region of the valve body that, at least in the closed position, is arranged in the funnel at the base of the container. As a result, in the region of the funnel, where the subsequently flowing pulverulent material could possibly compact, agglutination is counteracted and provision is made for rapid further transport downwards out of the funnel.

The vane(s) can begin approximately at the upper end of the valve body and can extend downwards along at least a third, optionally approximately half, of the valve body. As a result, the material to be metered is given good initial propulsion and, especially, can readily pass through the narrow portion between the funnel and the start of the outlet opening where the vanes are located after the valve body has been displaced vertically into the open position, by virtue of the mentioned dimensional conditions. In the closed position the narrow region of the valve body having the conveyor vanes can be arranged largely inside the funnel and can extend almost to the upper edge thereof. When the valve body is then displaced downwards, the same happens to the conveying means which in this way can pass into the region of the said narrow portion.

An additional or modified form of the invention can consist in that the lower region of the valve body, i.e. the region of larger diameter, has conveying means and/or means counteracting agglutination in the form of curved channels or the like of which the winding and curvature are preferably approximately helical in the manner of a conveyor screw, with the conveying direction being directed downwards when the valve body rotates, and which are arranged on the surface of the valve body. With the aid of such approximately helical channels, which, however, are at the same time also spiral as a result of the conical widening of the valve body, it is possible to exert a good conveying action on the material to be metered, which already has a tendency to move downwards under the action of gravity, and to counteract agglutination within the outlet opening. It is especially advantageous if, in the lower region, such conveyor channels and, in the upper region, especially, curved conveyor vanes or scoops are arranged on the valve body.

In order to break up any lumps of powder to be metered with greater reliability, it can be advantages if the walls of the funnel and/or the widening outlet opening have channels, grooves or the like, which are preferably directed downwards.

Especially when the above-described features and measures are applied in combination there is provided a discharge container of which the closure, when in the open position, has additional functions providing for good further transport of the material, which advantageously is also subjected to gravity. Accordingly, the metering operation can be ended very precisely by timely commencement of the closing movement, optionally accompanied by a reduction in the rotational speed of the valve body, especially towards the end of the metering operation. Beforehand, however, it is possible to effect a relatively rapid opening movement and, by selecting a suitable speed, also to accelerate the further transport of material, so that overall a rapid mode of operation is nevertheless possible. At the same time, the apparatus is of simple construction because it combines the conveying means and the closure in a single part.

The invention includes advantages features relating to the mounting of the shaft carrying the valve body in cooperation with a lid on the container which, contains a bearing for that shaft and can be displaced downwards together with the shaft until it reaches a stop. Means are provided for the displacement of the lid, which at the same time effect the displacement of the valve body into the open position.

The means for depressing the container lid are arranged to allow them to be advanced toward the lid. The means must, however, be removable for refilling of the container.

Means can be provided for common control of the parts that cooperate during metering, including the supply of collecting vessels which can receive the particular amount of dye metered on the scales.

In total, an apparatus is provided which is capable of rapid and precise operation but of which the overall mechanical construction is less complex, and in which in an advantageous manner gravity is exploited in the discharge of the amount to be metered, and a conveying means assisting the discharge of the dye or similar powder is combined with the closure of the outlet opening. With the intermediate arrangement of a computer or processor for coordinating the control of the individual elements it can readily be integrated into the operation of a laboratory dyeing line.

Figure 2:
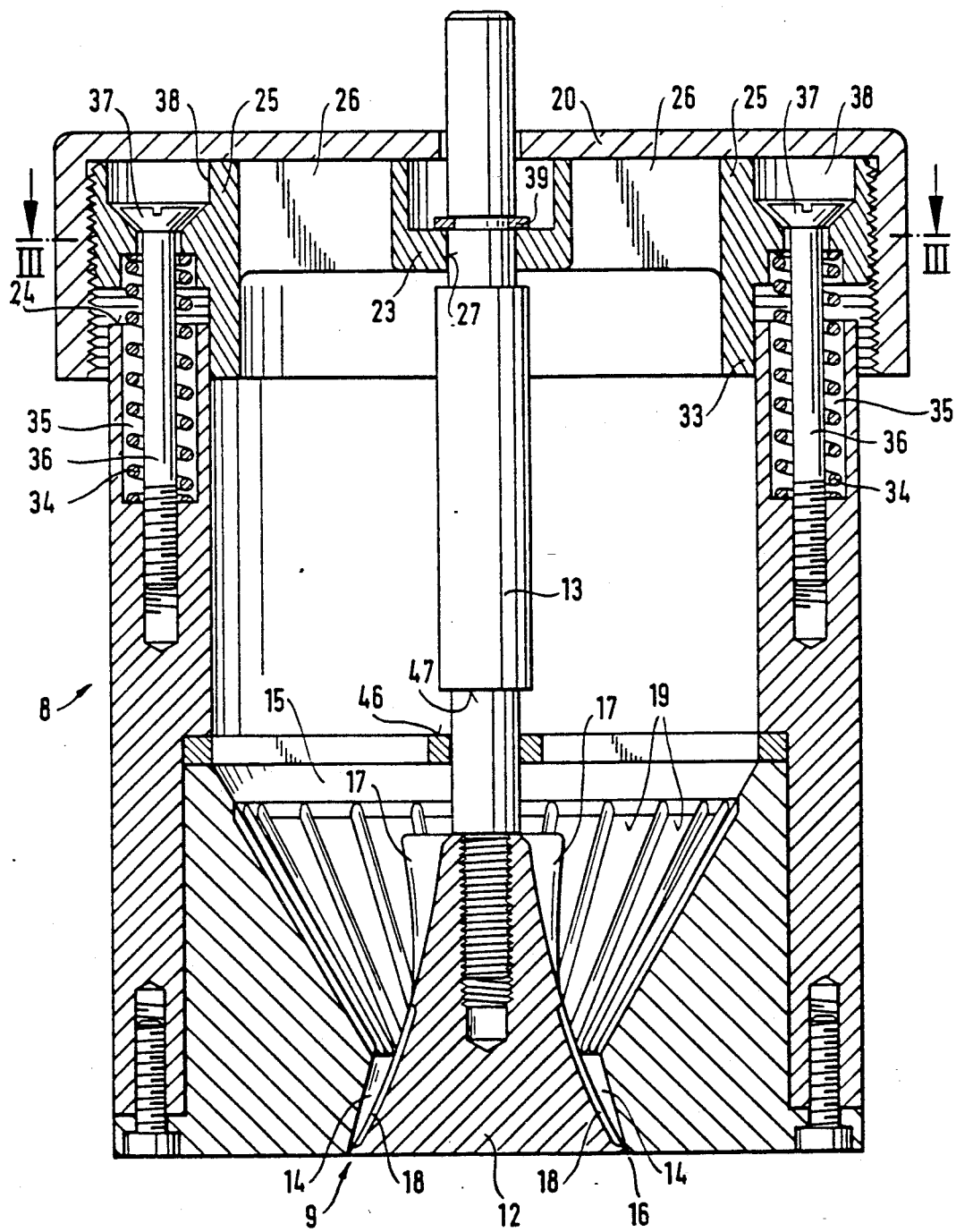
Figure 3:
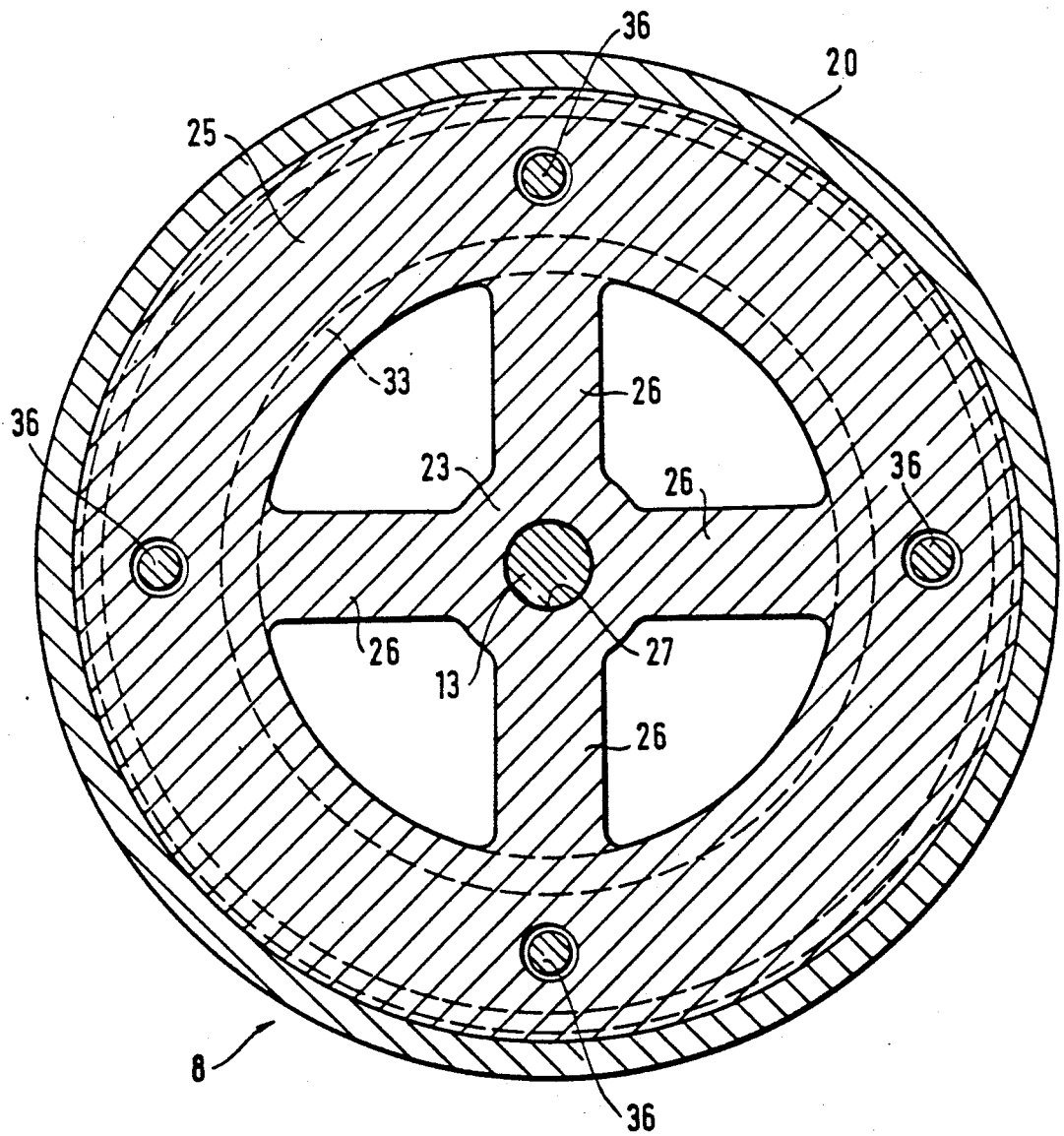
Figure 4:
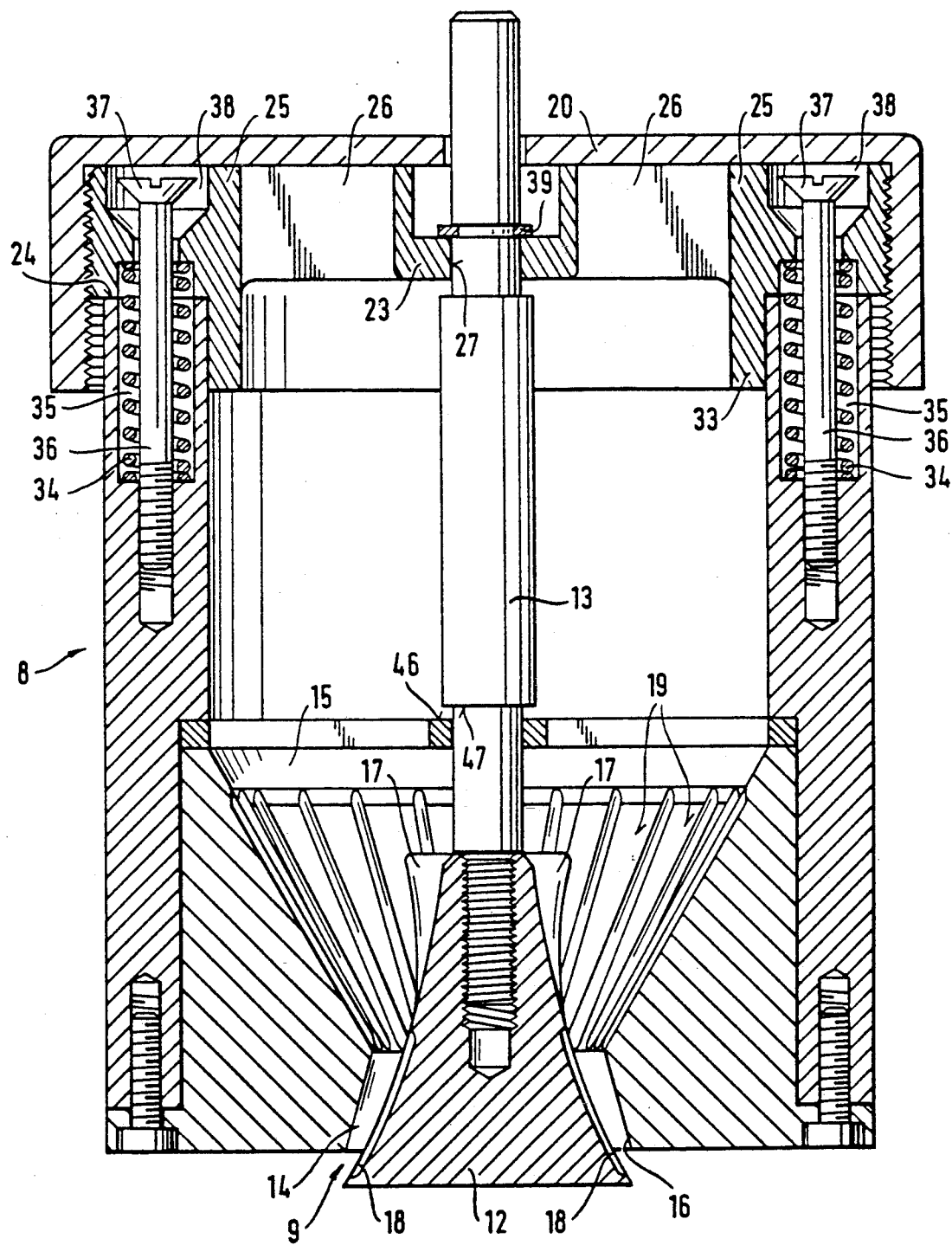
Figure 5:
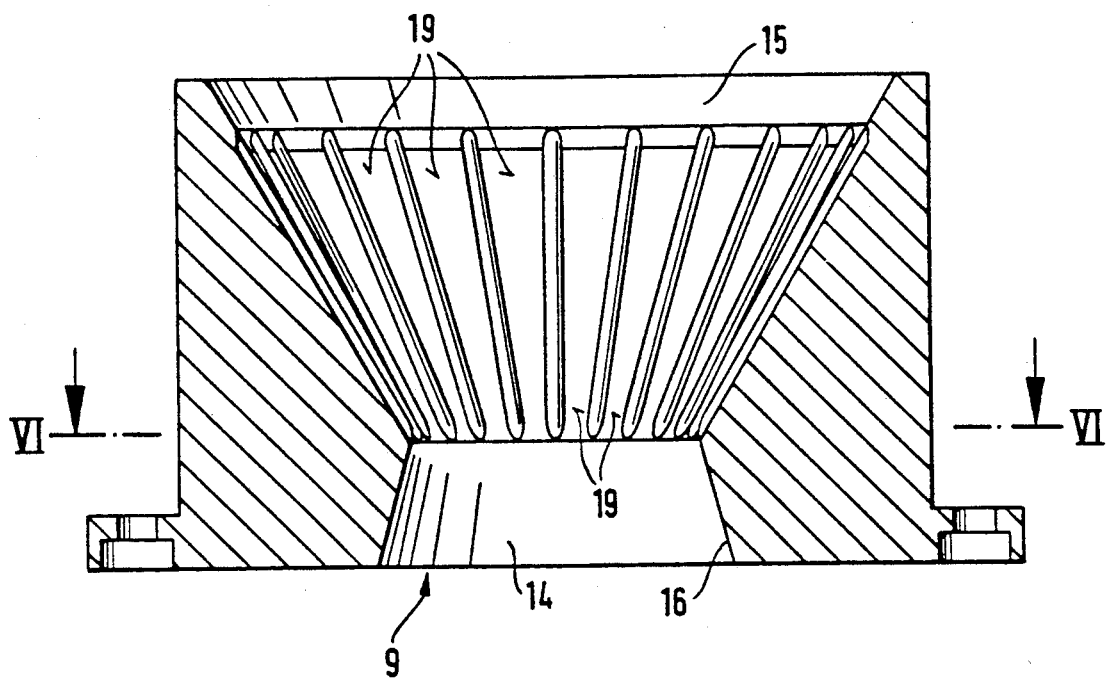
Figure 6:
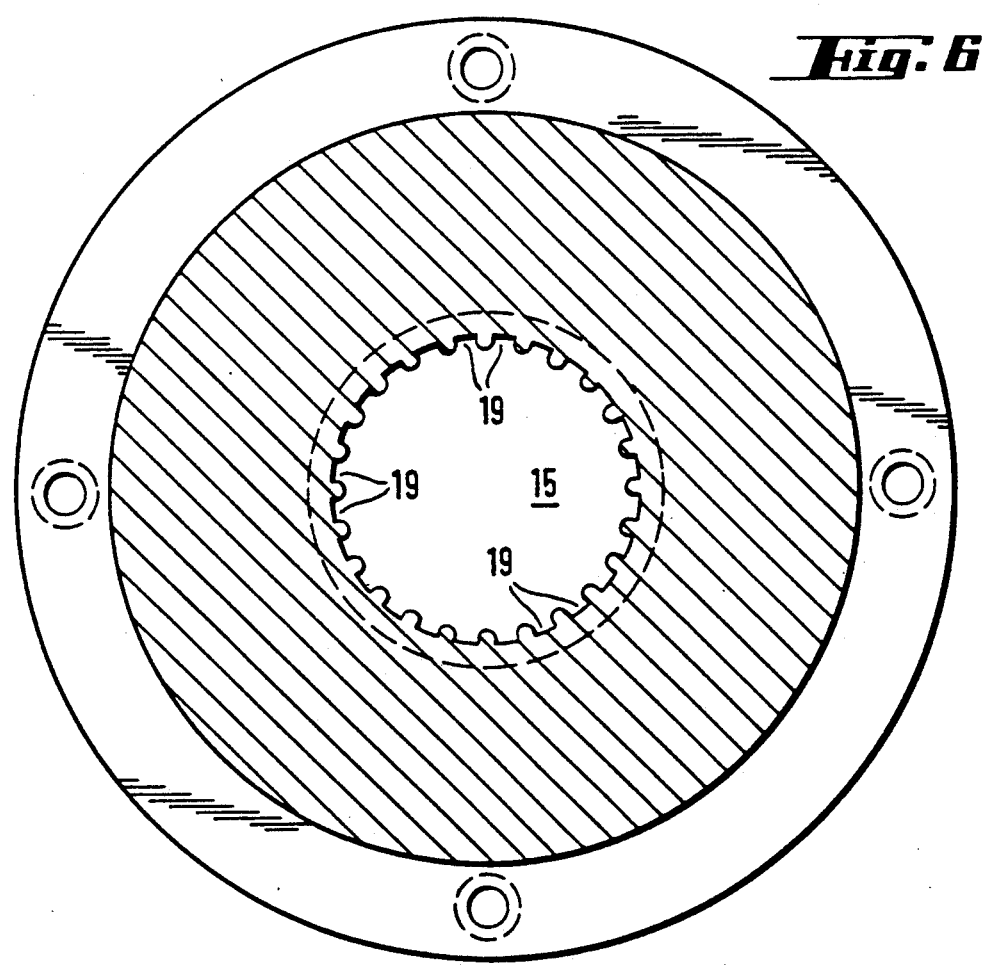
Figure 7:
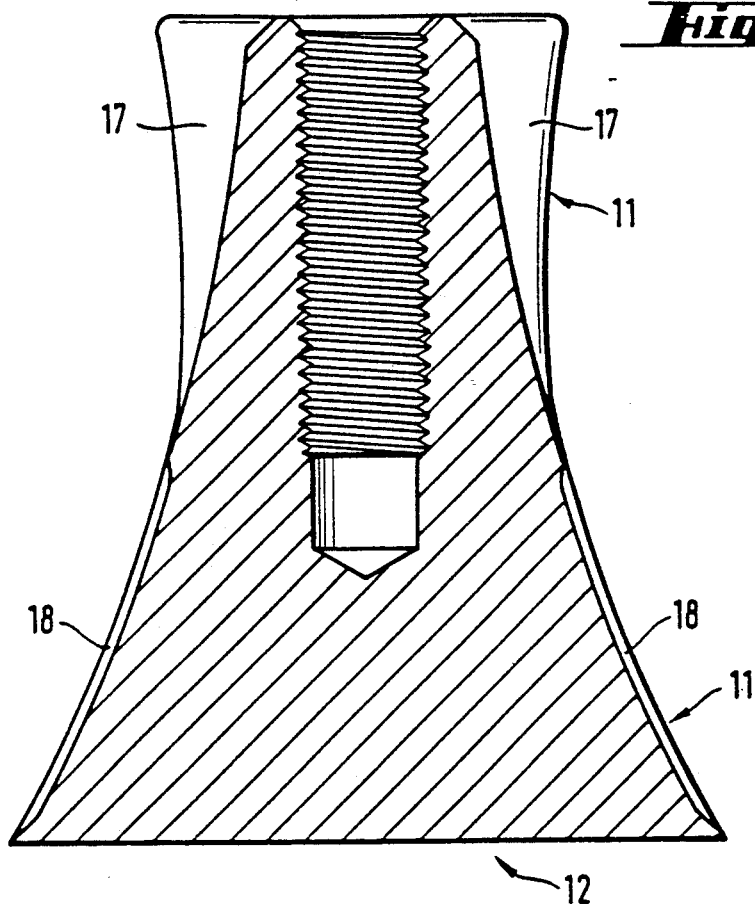
Figure 8:
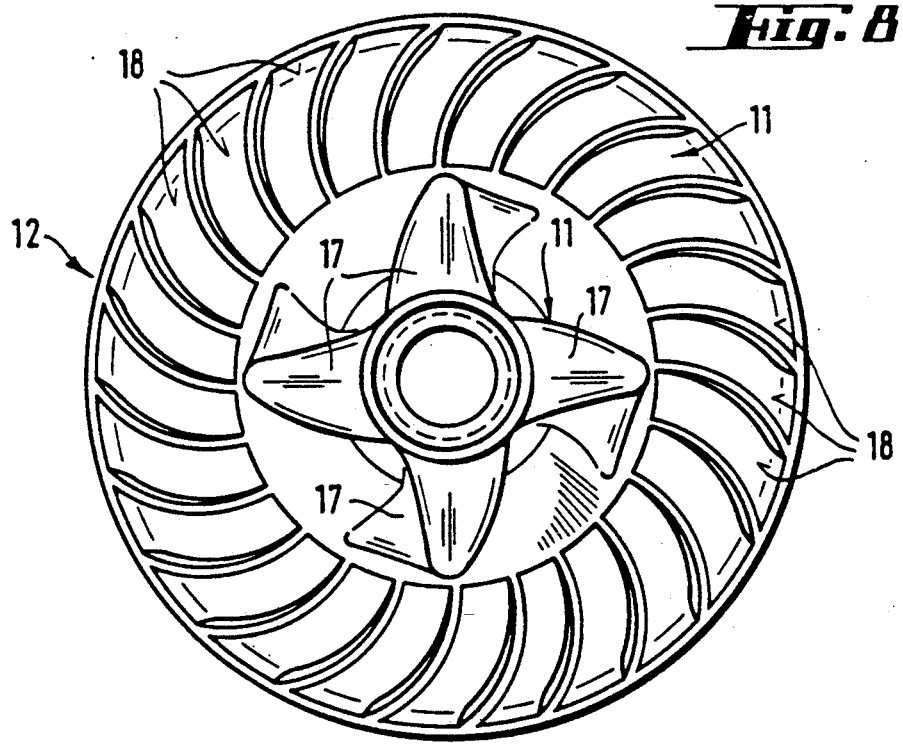

An embodiment of the invention having the essential components is described in more detail below by way of example with reference to the drawing which shows a partly diagrammatic view:

FIG. 1 is a view of an apparatus for metering pulverulent pourable material according to the invention, having a discharge container for the material, a scales arranged therebelow, a store for the beakers receiving the material on the scales with a device for isolating the beakers and supplying them to the scales, and indicates a computer serving to control the apparatus and to coordinate the individual functions, FIG. 2 is a view on an enlarged scale of a vertical section through the discharge container, the outlet opening being closed, FIG. 3 is a cross-section through the lid of the container and the bearing, arranged therein, for the shaft serving to displace and rotate a valve body;

FIG. 4 is a view corresponding to FIG. 2 of the container, the lid and the shaft bearing and also the valve body having been displaced vertically downwards into the open position, FIG. 5 shows the base portion of the container with the outlet opening, which can be closed by the valve body, and a funnel leading to that outlet opening, FIG. 6 is a cross-section through the base portion according to line VI—VI in FIG. 5, FIG. 7 is a vertical section through the valve body without the shaft that carries it, FIG. 8 is a plan view of the valve body according to FIG. 7 with four conveyor vanes arranged in its upper, narrower region and curved conveyor channels arranged in its lower, wider region, and FIG. 9 is a diagrammatic view of a laboratory dyeing line for textiles, in which the metering apparatus according to FIG. 1 can be provided.

An apparatus, indicated as a whole by the reference numeral 1, is used for the metering of dry and pulverulent pourable material, for example dye powder in a laboratory dyeing line for textiles, as shown diagrammatically in FIG. 9.

The textiles 2 to be treated can be withdrawn from a stand 3 of rolls and in an adjoining work station 4 prepared for dyeing.

Arranged parallel thereto is a supply container 5 for the dye powder which in work station 6 can be metered in using the apparatus 1 and then made into solution. In the actual dye bath 7 the piece of textile 2 in question can then be dyed with a precisely metered and mixed dye.

In order that the solution in dye bath 7 actually contains the correct amount of dye, accurate and precise metering is necessary with the aid of apparatus 1, which has for the purpose, according to FIG. 1, a discharge container 8 for the pourable material to be metered having in its lower region a closable outlet 9 to be described in more detail below. It is also important in this connection that the apparatus 1 is associated with a scale 10 which can be charged from the outlet 9 with the particular amount of pourable material to be metered using a rotating conveying means 11.

Once the correct desired amount of powder has been conveyed to the scales 10 in a manner to be described below, the outlet 9 is closed.

In FIGS. 2 to 4, and in the case of some components also in FIGS. 5 to 8, especially the discharge container 8, which is important for precise metering, having the outlet 9 and conveying means 11 is shown in more detail and on an enlarged scale. It will be seen that the outlet 9 is provided on the underside of the container 8 and has, as closure, a valve body 12 which tapers towards the top and, in accordance with FIG. 4, can be displaced vertically downwards for opening, this valve body 12 being drivable in rotation with the aid of a shaft 13 that carries it and being rotated at least while it is in the open position and having, according to FIGS. 7 and 8, means for conveying the material in the direction towards the outlet opening 14 of the outlet, which means advantageously at the same time counteract agglutination of the material. Advantageously, the aforementioned conveying means 11 and the closure of the outlet 9 are therefore formed by one and the same valve body 12, which not only performs a simple axial movement for opening and closing but also rotates in the open position in a manner unusual for a valve.

In the base region of the container 8 above the outlet opening 14 to be closed by the valve body 12 there is a funnel 15. The outlet opening 14 widens approximately conically from the narrowest point of that funnel 15 to the underside of the container 8 and towards the actual valve seat 16, this facilitating the discharge of powder when the valve is open since the valve body 12 also increases in cross-section in that direction.

The largest cross-section of the widening outlet opening 14 corresponds to the largest cross-section of the valve body 12 and in the closed position the lower end face of the valve body 12 is flush with the underside of the container 8. As a result, the valve seat, against which the largest cross-section of the valve body 12 rests in the closed position, is located on the underside of the container without the valve body 12 projecting beyond the underside.

According to FIGS. 7 and 8, vanes 17, in the embodiment shown four vanes 17 distributed uniformly over the circumference, are provided on the rotating valve body 12 as conveying means 11. FIG. 7 shows that these vanes 17, which together with the valve body 12 act as conveying means 11, are arranged in the upper region of the valve body 12 which is of reduced diameter. The vanes can be curved towards the bottom in the manner of a scoop so that when the valve body 12 rotates they effect the downward advance of the material, as is also the case in conveyor spindles or screws.

These vanes 17, which also prevent agglutination of the material, are arranged in the region of the valve body 12 that, at least in the closed position according to FIG. 2 but also in the open position according to FIG. 4, is arranged in the funnel 15 in the base region of the container 8, so that in this tapering and narrowing region, in which the pulverulent material sliding down afterwards could possibly tend to agglutinate, the material not only is transported further rapidly and in addition to the action of gravity but also is prevented from agglutinating. Should, however, the occasional lump still occur, it can immediately be broken down again by the vanes 17.

The vanes 17 extend from the upper end of the valve body 12, where, according to FIG. 7, they also have their greatest radial extent, and extend downwards along at least a third, optionally about half, of the valve body 12.

The lower region of the valve body 12 advantageously has further conveying means 11 which are also effective against agglutination, these being curved channels 18 or grooves of which the winding and curvature are approximately helical in the manner of a conveyor screw, with the conveying direction being directed downwards when the valve body 12 rotates, and which are arranged on the surface of the valve body 12. Since these channels or grooves 18 are located in the lower region of the valve body 12, they are effective in the region of the outlet opening 14 where, because of the narrowness of the internal gap when the valve body 12 is open, there would not be sufficient space for vanes 17. It is nevertheless possible in this region too to assist the conveying action of the rotating valve body and to prevent any lumps being left behind in the outlet gap with the aid of channels or grooves 18.

According to FIG. 6 it is also possible to provide the walls of the funnel 15 and/or of the widening outlet opening 14 with downwardly directed channels, grooves 19 or the like, which again counteract agglutination.

In FIGS. 2 and 4 and also in FIG. 1 it will be seen that the shaft 13 holding the valve body 12 projects above a lid 20 of the container 8. The projecting portion of the shaft 13 can be coupled or, according to FIG. 1, is coupled to a drive motor 21. The releasable coupling 22 can be seen in FIG. 1 between the drive motor 21 and the container 8.

According to FIGS. 2 and 3 the lid 20 through which the drive shaft 13 of the valve body 12 passes has a bearing 23 for that shaft 13 and can be displaced downwards together with the shaft 13, as far as a stop 24, against a restoring force. The bearing shown in FIG. 3 consists of a ring 25 over which the lid 20 engages and which is connected via spokes 26 to the central region forming the bearing 23, where there is also a passageway 27 for the shaft 13.

In order to displace the lid 20 and therewith the bearing 23 downwards in the vertical direction and thus in turn to open the rotating valve body 12, there are provided working cylinders 28, preferably pressure cylinders, that can be brought to rest on the upper side of the lid 20, the cylinders being shown in FIG. 1. The pressure cylinders 28 are arranged on a support 30 which can be displaced upwards and downwards above the container 8 with the aid of a spindle 29, the support 30 in the embodiment also carrying the drive motor 21 for the rotatable valve body 12. The spindle 29 is operated with the aid of a further motor 31 and can thereby effect the vertical displacement of an axially displaceable but non-rotatable nut 32 which is connected to the support 30 with the motor 21 and the cylinders 28, so that the working cylinders 28 and the motor 21 with the coupling 22 can be displaced, for example after the container 8 has been filled, into the operating position shown in FIG. 1.

The support 30 for the motor 21 can therefore be displaced downwards together with the motor into the coupling position and in that position the displacement elements of the pressure cylinders 28 are in contact or almost in contact with the lid 20 of the container 8, so that they are then available for depressing the lid 20.

The lid 20 or the ring 25 associated therewith engages a vertical guide on the container, in the embodiment with a collar 33 that projects into the internal opening of the container 8 and is centred on the upper rim region of the inner wall of the container 8 and can be displaced downwards against the force of compression springs 34 arranged in the wall region.

The compression springs 34 are arranged in recesses or holes 35 in the vessel wall so as to be axially parallel with the shaft 13 and project above the upper side of the container. In the embodiment they are constructed in the form of helical springs inside which there are arranged stay bolts 36 which limit the upward movement of the lid 20. The threaded portions of the bolts are screwed into the container wall while the heads 37 fix the lid 20 or the ring 25 associated therewith in a corresponding recess 38.

The highest position of the lid 20 and its ring 25, which position is fixed by the head 37 in the recess 38, can be seen in FIG. 2 and in that position the shaft 13 also is lifted to as high a level as possible by means of a retaining ring 39 on the hole 27 of the bearing 23, that is to say into the position in which the valve body 12 tightly closes the outlet opening 14.

When a certain amount of the container contents is to be discharged, the lid 20 is pressed down into the position shown in FIG. 4 or into an intermediate position between the positions of FIG. 2 and FIG. 4 and the valve body 12 is set in rotation with the aid of the motor 21. Then, as a result of gravity and the action of the vanes 17 and/or the channels 18, material can be released from the container 8 until the rotating movement is stopped and the valve is closed again. This can be controlled very sensitively during and, especially, towards the end of the metering operation by the choice of gap size.

FIG. 1 shows that for controlling the drive motors 21 and 31 and also the scales 10 arranged below the container 8 and a discharge device 41 for collecting beakers 42 there is provided a microcomputer 40 or a similar processor which, controlled by the scales 10, stops the drive motor 21 for the valve body 12 and the pressure cylinders 28 when a collecting beaker 42 standing on the scales 10 contains the preselected metered amount of material. Since the metered amount can be input into the processor beforehand, it can be so programed that shortly before that amount is reached it initiates the closing operation of the valve body and the slowing of its rotation so as to prevent the metering amount actually desired from being exceeded.

The containers 8 can, of course, also be provided with a lid 20 that is essentially immovable in the vertical direction. In that case the shaft 13 alone can be displaced downwards relative to the lid 20 against a restoring force. In that case the portion of the shaft 13 projecting beyond the lid 20 preferably has teeth with which a gear wheel of a servomotor for the vertical displacement can engage. Preferably the control of the drive motors is such that the servomotor for the vertical displacement is operated first and, after the closure has been opened, the drive motor 21 sets the shaft 13, with the valve body 12 attached thereto, in rotation.

In order to transport the collecting beakers 42 from their discharge device 41 to the scales 10 there is provided a rotating disc 43 or similar conveying means, in the embodiment a disc 43 having holes, a beaker 42 fitting into each of the holes 44. This transport disc 43 can be lowered slightly relative to the upper side of the scales in order to see down a beaker 42 on the scales 10, so that it releases the somewhat conical beakers 42 from the position shown in FIG. 1. In FIG. 1 the rotating disc 43 is shown shortly before it is lowered to release the beaker 42.

Conversely it would also be possible, for the same purpose, for the scales 10 to be lifted slightly out of the position shown.

The control of the individual drives, motors and assemblies by the computer 40 and the feedback from the individual assemblies to the computer are shown by the double-headed arrows in FIG. 1. It can also be seen in FIG. 1 that the beaker discharge device 41 and the drive 45 for the transport disc 43 are controlled by the scales 10 and/or the drive 21 for the rotating valve body 12 via the computer 40. It is thereby ensured that whenever a beaker 42 has been filled with a metered amount of pulverulent material, it can be transported away and a fresh beaker 42 supplied.

It has already been indicated that the gap size and/or the speed of the rotating valve body 12 are(is) adjustable. This too can be effected by control via the computer 40.

Inside the container 8 it is possible to provide a lower stop 46 for a projection 47 on the shaft 13 of the rotating valve body 12 to limit the greatest possible opening. It can be seen in FIG. 4 that this stop 46 is not normally reached at all, since the lid 20 will have already reached its lowest position before hand.

Using the apparatus 1 shown and described it is possible to discharge a very precisely metered amount of a pulverulent material from the container 8 without the metered amount being falsified as a result of agglutination and the like and without it being necessary to set too slow an operating speed in order to obtain the desired precise metering. This is assisted by the fact that gravity and the conveying means together discharge the material and the conveying means at the same time cooperate with a funnel and a conically widening outlet opening in such a manner that agglutination and clogging are avoided and an additional conveying action is exerted on the material. As a result of the construction of the container 8 according to the invention and its closure, there is virtually no contamination of the work area with the pulverulent material. In order to eliminate any risk of contamination, the container 8 can be provided in the region of the valve closure with an additional closure slide which can be opened manually before the insertion of the discharge container 8 into the metering device 1 or, in an especially preferred manner, can be opened after the insertion of the container 8 into the metering device with the aid of rams operated pneumatically, electrically or in some other way.

What is claimed is:

1. An apparatus for metering dry or pulverulent pourable material, comprising:
    a discharge container having a closable outlet formed through an underside thereof and adapted to have the material discharged therethrough;
    weighing means, mounted below said outlet, for metering the material discharged through said outlet of said container;
    a valve body mounted in said container for selectively closing said outlet, said valve body being tapered upwardly and inwardly, being displaceable vertically downwardly from a closed position to an open position, and being rotatable at least while in the open position; and
    conveying means, disposed on said valve body, for conveying the material toward said outlet and for counteracting agglutination of the material.
2. An apparatus according to claim 1, wherein said container further has a funnel formed above said outlet, said funnel being tapered inwardly and downwardly.
3. An apparatus according to claim 2, wherein said outlet extends downwardly from a bottom end of said funnel, and tapers downwardly and outwardly therefrom; and
    said container further has a valve seat formed in the underside thereof for seating of said valve body.
4. An apparatus according to claim 3, wherein when said valve body is in the closed position, a lower face of said valve body is flush with the underside of said container.
5. An apparatus according to claim 2, wherein said conveying means is operable to be positioned within said funnel when said valve body is in the closed position.
6. An apparatus according to claim 2, wherein a plurality of downwardly extending channels are formed along a peripheral wall of at least one of said funnel and said outlet.
7. An apparatus according to claim 1, wherein said conveying means includes at least one vane provided on said valve body.
8. An apparatus according to claim 7, wherein said at least one vane is provided on an upper portion of said valve body and is curved from top to bottom in the form of a scoop such that the material is conveyed downwardly when said valve body rotates.
9. An apparatus according to claim 7, wherein said at least one vane extends approximately from an upper end of said valve body and downwardly along at least a third of said valve body.
10. An apparatus according to claim 1, wherein said conveying means comprises a plurality of approximately helically curved channels extending along a lower portion of said valve body.
11. An apparatus according to claim 1, further comprising
    a lid mounted to an upper end of said container; and
    a shaft having a bottom end coupled to said valve body, having a top end adapted to be coupled to a drive motor, and being operatively coupled to said lid for vertical displacement therewith.
12. An apparatus according to claim 11, further comprising
    biasing means for biasing said shaft upwardly;
    movable mounting means for mounting said lid to said container such that said lid is vertically displaceable relative to said container; and
    wherein said lid includes a bearing through which said shaft extends and which couples said shaft to said lid for vertical movement therewith.
13. An apparatus according to claim 12, further comprising
    working cylinder means for pressing said lid downwardly relative to said container.
14. An apparatus according to claim 13, further comprising
    a support means, mounted above said lid, for supporting the drive motor.
15. An apparatus according to claim 14, wherein said working cylinder means comprises a pressure cylinder; and
    said support means is vertically displaceable and is operable to press said working cylinder means downwardly into contact with said lid.
16. An apparatus according to claim 11, further comprising
    a vertical guide means for vertically guiding said lid; and
    compression springs mounted to a peripheral wall of said container for biasing said lid upwardly.
17. An apparatus according to claim 16, wherein vertically extending recesses are formed in said peripheral wall of said container, and said compression springs are respectively mounted in said recesses, said compression springs comprising helical springs; and
    stay bolts are mounted through said helical springs, respectively, and to said container, and are operable to limit upward movement of said lid relative to said container.

18. An apparatus according to claim 11, further comprising
control means for causing said valve body to move to the closed position when said weighing means has determined that a predetermined amount of the material has been discharged through said outlet;
wherein collecting beakers are disposed on said weighing means for receiving the material discharged through said outlet;
wherein said drive motor is operable to rotate said shaft; and
wherein said control means comprises a computer and is further operable to stop said drive motor when said weighing means determines that one of said collecting beakers contains the predetermined amount of the material.

19. An apparatus according to claim 18, further comprising
a transport disc having holes formed therein;
collecting beaker discharge means for discharging collecting beakers into said holes of said transport disc, respectively;
rotating means for rotating said transport disc to move the beakers into position beneath said outlet;
lift means for raising and lowering said transport disc so that the beakers can be lowered onto and raised away from said weighing means.

20. An apparatus according to claim 19, wherein said control means is further operable to control rotation of said rotating means and discharge of the beakers by said collecting beaker discharge means.

21. An apparatus according to claim 11, wherein said shaft is provided with a projection; and
a lower stop is mounted in said container for engaging said projection, limiting downward movement of said shaft and said valve body, and defining a maximum open position of said valve body.

22. An apparatus according to claim 1, further comprising
means for rotating said valve body; and
means for adjusting a rotational speed of said valve body and for adjusting a size of said outlet.

* * * * *